(12) United States Patent
Asai et al.

(10) Patent No.: US 8,034,855 B2
(45) Date of Patent: Oct. 11, 2011

(54) POLYACETAL RESIN COMPOSITION

(75) Inventors: Seizaburoh Asai, Tokyo (JP); Atsushi Koyama, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/539,014

(22) Filed: Aug. 11, 2009

(65) Prior Publication Data

US 2010/0261817 A1    Oct. 14, 2010

(30) Foreign Application Priority Data

Aug. 11, 2008   (JP) ................. 2008-206761

(51) Int. Cl.
    C08K 5/34      (2006.01)
    C08K 5/3435    (2006.01)
    C08K 5/09      (2006.01)
    C08K 5/053     (2006.01)
    C08K 3/10      (2006.01)

(52) U.S. Cl. .......... 524/99; 524/102; 524/190; 524/386; 524/437

(58) Field of Classification Search ............ 524/99, 524/102, 190, 386, 437
    See application file for complete search history.

(56) References Cited

U.S. PATENT DOCUMENTS

| | | | |
|---|---|---|---|
| 5,849,072 A | | 12/1998 | Sommer et al. |
| 5,962,683 A | * | 10/1999 | Steinmann et al. ............ 544/180 |
| 2002/0016395 A1 | * | 2/2002 | Niino et al. .................... 524/394 |
| 2004/0151940 A1 | | 8/2004 | Takano et al. |
| 2004/0232717 A1 | * | 11/2004 | Ariyasu ....................... 296/1.11 |
| 2007/0179231 A1 | | 8/2007 | Sonobe et al. |

FOREIGN PATENT DOCUMENTS

| | | |
|---|---|---|
| JP | 8-510294 | 10/1996 |
| JP | 2001-261978 | 9/2001 |
| JP | 2007-191738 | 8/2007 |
| WO | 02/094950 | 11/2002 |
| WO | 03/022926 | 3/2003 |
| WO | 2004/026970 | 4/2004 |

OTHER PUBLICATIONS

English language Abstract of WO 94/28074 (corresponding to JP 8-510294, published Oct. 29, 1996).

* cited by examiner

*Primary Examiner* — Kriellion Sanders
(74) *Attorney, Agent, or Firm* — Greenblum & Bernstein, PLC (57) ABSTRACT

Polyacetal resin compositions, including a polyacetal copolymer, 0.2 to 2 parts by mass of a hindered amine material and 0.2 to 10 parts by mass of powdery aluminum, with respect to 100 parts by mass of a polyacetal copolymer, and 0.3 to 10 parts by mass of a fatty acid having a carbon number of 10 to 30, with respect to 100 parts by mass of the powdery aluminum. Methods of making the compositions, and end products including the resin compositions are also provided.

18 Claims, 2 Drawing Sheets

POLYACETAL RESIN COMPOSITION

CROSS-REFERENCE TO RELATED APPLICATIONS

The present application claims priority under 35 U.S.C. §119 of Japanese Application No. 2008-206761 filed on Aug. 11, 2008, the disclosure of which is expressly incorporated by reference herein in its entirety.

BACKGROUND OF THE INVENTION

1. Field of the Invention

The present invention relates to a polyacetal resin composition with small environmental impact capable of maintaining mechanical properties inherent in polyacetal resin and stably providing a molded body having an excellent appearance.

2. Description of Patent Literature

Polyacetal resin has high mechanical strength and rigidity; excellent oil resistance, organic solvent resistance, and self-lubricating property; a good balance in a wide temperature range; and an easy processability. Thus, the material is widely used, as representative engineering plastics, in mechanism parts and sliding parts for precision equipment, home appliances, OA equipment, vehicles, industrial materials, general merchandise, and the like. With recent expansion in applied areas of polyacetal resin, higher performance has currently been demanded. In such a trend, trials have been performed to enhance designability of molded bodies formed of polyacetal resin, by improving appearance and providing metal glossiness.

For instance, a production method of a molded body formed from adhesive resistant resin is proposed, in which a surface of a base material is blasted, and a metal film is formed on the surface through vacuum vapor deposition (for example, Patent Literature 1). When coating is employed to enhance appearance, coating material is also improved. A metal pigment dispersion is proposed, for instance, which is formed from a metal pigment in flake form and a binder or binder solution, the metal pigment having an extremely low content of products generated in fatty acid reaction or decomposition (for example, Patent Literature 2). Further, a powder coating composition is proposed, which contains thermoset resin powder on which a flake pigment is bound to a surface (for example, Patent Literature 3).

In addition, resin containing a glossy pigment is molded so as to display metal glossiness for designability. For instance, a method is proposed in which an optically changeable metallic pigment and a colorant are included for a predetermined amount into thermoplastic resin (for example, Patent Literature 4). Alternatively, a method is proposed in which a glossy pigment to be added in resin is included, the glossy pigment having particular aluminum particles (for example, Patent Literature 5).

Further, polytrimethylene terephthalate resin is proposed having excellent appearance, light resistance, and rigidity, the resin being included in vehicle exterior parts formed from resin (for example, Patent Literature 6).

[Patent Literature 1] Japanese Patent Laid-open Publication No. 2007-191738
[Patent Literature 2] Japanese Patent Application Publication No. H8-510294
[Patent Literature 3] WO Publication No. 2002/094950
[Patent Literature 4] Japanese Patent Laid-open Publication No. 2001-261978
[Patent Literature 5] WO Publication No. 2004/026970
[Patent Literature 6] WO Publication No. 2003/022926

The coating methods described in Patent Literatures 1 to 3 achieve a good appearance; however, the methods are not efficient since they require an extremely large number of controlled processes. In addition, the methods are not necessarily satisfactory given an impact of solvents on an environment or human bodies. Further, when the methods described in Patent Literatures 4 and 5 are applied to polyacetal resin in the above described trials, there are cases where mechanical properties inherent in the resin are deteriorated or an improvement in appearance is insufficient, because of an impact of heat generation during melt-mixing or an active site of a metal surface. Further, it is described in Patent Literature 6 that polyacetal resin and a glass fiber are mixed; that aluminum powder is added to the mixture; and that the materials are melt-kneaded. The method, however, does not achieve a good appearance, thus not providing a satisfactory molded body. Furthermore, no improving method for obtaining a good appearance was mentioned.

For polyacetal resin molded bodies used as design parts including a mechanical portion or a sliding portion in particular, a polyacetal resin composition with small environmental impact is thus demanded capable of maintaining mechanical properties inherent in the resin and stably providing molded bodies having an excellent appearance.

SUMMARY OF THE INVENTION

An advantage of the present invention is to provide a polyacetal resin composition with small environmental impact capable of maintaining mechanical properties inherent in polyacetal resin and stably providing a molded body having an excellent appearance.

The inventors of the present invention have discovered the polyacetal resin composition capable of solving the above-described problems, after an intensive study of mixing of polyacetal resin and powdery aluminum in order to improve an appearance of polyacetal resin and thus provide designability.

Specifically, the present invention relates to the following:

(1) A polyacetal resin composition including a polyacetal copolymer and 0.2 to 2 parts by mass of hindered amine material and 0.2 to 10 parts by mass of powdery aluminum, with respect to 100 parts by mass of a polyacetal copolymer; and 0.3 to 10 parts by mass of a fatty acid having a carbon number of 10 to 30, with respect to 100 parts by mass of the powdery aluminum;

(2) The polyacetal resin composition according to (1) above, wherein the polyacetal copolymer has a melt mass flow rate (MFR) of 2.5 to 40 g/10 minutes;

(3) The polyacetal resin composition according to (1) or (2) above, further including 0.3 to 3 parts by mass of a polyalkylene glycol, with respect to 100 parts by mass of the polyacetal copolymer;

(4) The polyacetal resin composition according to (3) above, wherein the polyalkylene glycol is a polyethylene glycol having a number average molecular weight of 800 to 500,000;

(5) The polyacetal resin composition according to one of (1) to (4) above, further including 0.03 to 0.25 part by pass of a hydrazide compound, with respect to 100 parts by mass of the polyacetal copolymer;

(6) The polyacetal resin composition according to one of (1) to (5) above, wherein the hindered amine material has a piperidine derivative structure represented by a general formula (3);

[Chemical formula 1]

(3)

(where $R_1$ to $R_4$ are identical or different alkyl groups)

(7) The polyacetal resin composition according to one of (1) to (6) above, wherein the powdery aluminum has a discoidal or scale-like shape;

(8) The polyacetal resin composition according to one of (1) to (7) above, wherein the powdery aluminum has an average particle diameter of 3 to 80 μm;

(9) The polyacetal resin composition according to one of (1) to (8) above, wherein the powdery aluminum has a particle diameter distribution [Dw/Dn] of 1.1 to 2.0;

(10) The polyacetal resin composition according to one of (1) to (9) above, wherein the powdery aluminum has an average particle thickness of 0.4 μm or greater;

(11) The polyacetal resin composition according to one of (1) to (10) above, wherein the powdery aluminum includes at least two types of the powdery aluminum having a difference in the average particle diameter of 20 μm or greater;

(12) A molded body formed from the polyacetal resin composition according to one of (1) to (11) above;

(13) The molded body according to (12) above, which is a part used for OA equipment, audio, video, or information devices, or a communication device; an industrial part used for office furniture and housing equipment; or a vehicle interior/exterior part;

(14) The molded body according to (12) or (13) above, wherein the part is one of a handle, a switch, and a button;

(15) The molded body according to one of (12) to (14) above, wherein a design surface of the part is partially or entirely grain processed;

(16) A method of producing the polyacetal resin composition according to one of (1) to (11) above, the method including mixing the powdery aluminum and the fatty acid; pre-melt-kneading the polyacetal copolymer and the hindered amine material; and mixing the mixtures obtained from the mixing and the pre-melt-kneading; and (17) The method of producing the polyacetal resin composition according to (16) above, wherein the powdery aluminum is dried, and then mixed with the fatty acid.

The polyacetal resin composition according to the present invention can provide a molded body maintaining good mechanical properties inherent in polyacetal resin and having an excellent appearance. In addition, the polyacetal resin composition according to the present invention does not require coating at the time of production of a molded body, thus preventing deterioration of a work environment caused by a solvent and enabling stable production of good products. Thereby, the polyacetal resin composition can provide an eco-friendly molded body.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values within that range. For example, if a range is from about 1 to about 50, it is deemed to include, for example, 1, 7, 34, 46.1, 23.7, or any other value within the range.

The embodiments of the present invention are explained in detail below. A polyacetal resin composition according to the present invention mainly includes a polyacetal copolymer, hindered amine material, powdery aluminum, and a fatty acid.

[Polyacetal Copolymer]

The polyacetal resin composition according to the present invention includes a polyacetal copolymer, which allows for maintenance of production stability at the time of melt-kneading. The polyacetal copolymer according to the present invention can be obtained in a number of manners, including a process described below.

1. Polymerization Process

The polyacetal copolymer according to the present invention is a polymer having an oxymethylene group as a main chain and an oxyalkylene unit having two or more carbons.

Polymerization can be implemented using any methods, examples of which are known. The known methods are described, for example, in U.S. Pat. No. 3,027,352; U.S. Pat. No. 3,803,094; DE-C-1161421; DE-C-1495228; DE-C-1720358; DE-C-3018898; Japanese Patent Laid-open Publication No. S58-98322; Japanese Patent Laid-open Publication No. H7-70267. The polymerization process provides an intermediate polymer of the polyacetal copolymer.

<Main Raw Material—Monomer>

It is preferable to use as the main monomer, formaldehyde or a cyclic oligomer, which includes a trioxane (a trimer of formaldehyde), a tetraoxane (a quadromer thereof), and the like. It is preferable to use as the comonomer, one type or a mixture of two or more types selected from a cyclic ether compound and a mono- or di-glycidyl compound, the cyclic ether compound having an oxyalkylene unit having two or more carbons, the mono- or di-glycidyl compound being capable of forming a branched or cross-linked structure in a molecule. Examples of the cyclic ether compounds include, for example, ethylene oxides, propylene oxides, 1,3-dioxolans, 1,3-propanediol formals, 1,4-butanediol formals, 1,5-pentanediol formals, 1,6-hexanediol formals, diethylene glycol formals, 1,3,5-trioxepanes, and 1,3,6-trioxocanes. A copolymerization amount of the comonomer component in the present invention is 1 to 10 mol, preferably 1 to 5 mol, with respect to 100 mol of trioxane (formaldehyde trimer), when the main monomer is converted as trioxane. Controlling the copolymerization amount of the comonomer component in the preferable range further improves stability of a polymerization reaction and further enhances mechanical properties, such as strength, rigidity, and the like.

Impurities, such as water, a methanol, a formic acid, and the like, are excluded as much as possible from the main monomer and comonomer of the polyacetal copolymer, as the impurities can have polymerization termination and chain transfer effects during a polymerization reaction. When there are excessive impurities, a desired molecular weight product may not be obtained due to an unexpected chain transfer reaction. The content of impurities is preferably 30 ppm by mass or less, or more preferably 10 ppm by mass or less, and even more preferably 3 ppm by mass or less, with respect to an entire monomer amount. Desired main raw material having low impurities may be obtained by any methods, examples of which are known. Examples of the known methods include Japanese Patent Laid-open Publication No. H3-123777 and Japanese Patent Laid-open Publication No. H7-33761 for the main monomer, and Japanese Patent Laid-open Publication No. S49-62469 and Japanese Patent Laid-open Publication No. H5-271217 for the comonomer.

<Chain Transfer Agent>

It is preferable to use as a chain transfer agent, known substances, including, for example, a dialkyl acetal of formaldehyde, in which an alkyl group is a low aliphatic alkyl group, known such as methyl, ethyl, propyl, isopropyl, butyl, and the like; an oligomer thereof; and a low aliphatic alcohol, such as methanol, ethanol, propanol, isopropanol, butanol, and the like. A polyether polyol or a polyether polyol alkylene oxide may be used in order to obtain a long-chain branching polyacetal. Further, in order to obtain a block polyacetal copolymer, a polymer having a number average molecular weight of 400 or greater may be chain transferred, the polymer having at least one of a hydroxyl group, a carboxyl group, an amino group, an ester group, and an alkoxy group. Furthermore, two or more types of the above-described chain transfer agents may be used. In any case, it is preferable that formation of an unstable terminal be limited as much as possible.

<Polymerization Catalyst>

It is preferable to use as cation active catalysts as the polymerization catalyst of the polyacetal copolymer, including Lewis acids, a proton acids, and esters or anhydrides thereof. Examples of Lewis acids include halides of boric acid, tin, titanium, phosphorus, arsenic, and antimony; more specifically, boron trifluoride, tin tetrachloride, titanium tetrachloride, phosphorus pentafluoride, phosphorus pentachloride, antimony pentafluoride, and a complex compound or salt thereof. Examples of proton acids and esters or anhydrides thereof include perchloric acid, trifluoromethanesulfonic acid, perchloric acid tertiary butyl ester, acetyl perchlorate, trimethyloxonium hexafluorophosphate, and the like. Particularly, boron trifluoride, boron trifluoride hydrate, and coordinate complexes of an organic compound that includes oxygen atoms or sulfur atoms, and boron trifluoride are preferable. Specifically, boron trifluoride diethyl ether and boron trifluoride di-n-butyl ether can be listed as suitable examples. The amount of the polymerization catalyst used is preferably $1 \times 10^{-6}$ mol to $1 \times 10^{-3}$ mol, or more preferably $5 \times 10^{-6}$ mol to $1 \times 10^{-4}$ mol, with respect to a total amount of 1 mol of a trioxane and a cyclic ether and/or cyclic formal. Controlling the amount in the range further improves both reaction stability at the time of polymerization and thermal stability of molded body obtained. A cocatalyst may be used in the present invention, when required.

2. Terminal Stabilization/Pelletization Process

The polyacetal copolymer according to the present invention can be obtained by decomposing an unstable terminal portion included in the rough polymer obtained in the preceding process. The unstable terminal portion can be decomposed and removed, for example, by melting the rough polymer using a single-axis screw-type extruder with vents, or a twin-axis screw-type extruder with vents, in the presence of a decomposing agent, examples of which are known, and which are generally basic materials. When melt-kneading is performed in the terminal stabilization process, it is preferable to perform substitution with an inert gas, or deaeration using single or multiple vents, in order to maintain quality or a work environment. Melt-kneading is preferably performed at a temperature between the melt point of the polyacetal copolymer and 260° C. Further, it is preferable to perform pelletization by melt-kneading the polyacetal copolymer while adding a stabilizer, examples of which are known, that can be added to conventional polyacetal resin. During the pelletization process, hindered amine material described below may be added in advance of melt-kneading.

An MFR (melt mass flow rate; ISO 1133 condition D; load: 2.16 kg; cylinder temperature: 190° C.) of the polyacetal copolymer obtained herein is preferably controlled to 2.5 to 40 g/10 minutes, more preferably to 3 to 30 g/10 minutes, and particularly preferably to 3.5 to 25 g/10 minutes. Controlling the MFR in the range allows good maintenance of productivity and weld properties of the molded body obtained.

<Decomposing Agent>

As the decomposing agent, examples of known basic materials include ammonia; fatty amines, such as triethylamine, tributylamine, and the like; and hydroxides, inorganic weak acid salts, organic weak acid salts, and the like of alkali metals or alkaline-earth metals, such as calcium hydroxide. A particularly preferable method is to treat a thermally unstable terminal by using, as the decomposing agent, at least one type of a quaternary ammonium compound represented by a general formula (1) below. A polyacetal copolymer stabilized in the method above has very little residual unstable terminal portion.

$$[R_1R_2R_3R_4N^+]_n X^{n-} \quad (1)$$

(where $R_1$, $R_2$, $R_3$, and $R_4$ independently represent an unsubstituted alkyl group or substituted alkyl group having 1 to 30 carbons; an aryl group having 6 to 20 carbons; an aralkyl group whose unsubstituted alkyl group or substituted alkyl group of 1 to 30 carbons is substituted with at least one aryl group having 6 to 20 carbons; and an alkyl-aryl group whose aryl group having 6 to 20 carbons is substituted with at least one unsubstituted alkyl group or substituted alkyl group having 1 to 30 carbons, respectively; where the unsubstituted alkyl group or substituted alkyl group has a straight chain, branched, or cyclical structure; where a hydrogen atom of the above-described unsubstituted alkyl group, aryl group, aralkyl group, and alkyl-aryl group may be substituted with a halogen; where n represents an integer of 1 to 3; and where X represents a hydroxyl group, an acid residue of a carboxylic acid having 1 to 20 carbons, a hydroacid, an oxo-acid inorganic thio acid, or an organic thio acid having 1 to 20 carbons.)

Specific examples of the above-described quaternary ammonium salt compounds include hydroxides of tetramethylammonium, tetraethylammonium, tetrapropylammonium, tetra-n-butylammonium, cetyltrimethylammonium, tetradecyltrimethylammonium, 1,6-hexamethylenebis(trimethylammonium), decamethylene-bis-(trimethylammonium), trimethyl-3-chloro-2-hydroxypropyl ammonium, trimethyl (2-hydroxyethyl)ammonium, triethyl (2-hydroxyethyl)ammonium, tripropyl (2-hydroxyethyl)ammonium, tri-n-butyl (2-hydroxyethyl)ammonium, trimethylbenzylammonium, triethylbenzylammonium, tripropylbenzylammonium, tri-n-butyl benzyl ammonium, trimethyl phenyl ammonium, triethyl phenyl ammonium, trimethyl-2-oxyethyl ammonium, monomethyl trihydroxyethyl ammonium, monoethyl trihydroxyethyl ammonium, octadecyl tri (2-hydroxyethyl)ammonium, tetrakis(hydroxyethyl) ammonium, and the like.

Examples also include hydro acid salts (excluding halogenation), such as hydrogen azide and the like; oxo-acid salts, such as sulfuric acid, nitric acid, phosphoric acid, carbonic acid, boric acid, chloric acid, iodic acid, silicic acid, perchloric acid, chlorous acid, hypochlorous acid, chlorosulfuric acid, amidosulfuric acid, disulfuric acid, tripoly phosphoric acid, and the like; thio-acid salts, such as thiosulfuric acid; and carboxylates, such as formic acid, acetic acid, propionic acid, butanoic acid, isobutyric acid, pentanoic acid, caproic acid, caprylic acid, capric acid, benzoic acid, oxalic acid, and the like. Particularly, hydroxide ($OH^-$), sulfuric acid ($HSO_4^-$, $SO_4^{2-}$), carbon acid ($HCO_3^-$, $CO_3^{2-}$), boric acid ($B(OH)_4^-$), and carboxylic salt are preferable. Of carboxylic acids, formic acid, acetic acid, and propionic acid are particularly preferable. One of the quaternary ammonium compounds may be used, or a combination of two or more thereof may be used.

An additive amount of the quaternary ammonium compound with respect to the rough polymer is preferably 0.05 to 50 ppm by weight, in terms of an amount of nitrogen derived from a quaternary ammonium compound represented by an expression (A) below.

$$P \times 14/Q \quad (A)$$

(where P represents a concentration (ppm by weight) of a quaternary ammonium compound with respect to an intermediate polymer; 14 represents an atomic weight of nitrogen; and Q represents a molecular weight of the quaternary ammonium compound)

The quaternary ammonium compound may be added in advance before the rough polymer is melted. Alternatively, the compound may be added to the melted rough polymer.

In the present invention, known decomposing and solving agents, such as ammonia, triethylamine, a boric-acid compound, and the like, may be used along with the quaternary ammonium compound.

[Hindered Amine Material]

The polyacetal resin composition according to the present invention includes at least one hindered amine material. The content of the hindered amine material is 0.2 to 2 parts by mass with respect to 100 parts by mass of the polyacetal copolymer, preferably 0.25 to 1.5 parts by mass, and more preferably 0.3 to 1.2 parts by mass. Controlling the content in the range allows a molded product to maintain an excellent appearance. One or more types of hindered amine material may be used in the composition.

It is preferable that the hindered amine material of the present invention have a piperidine derivative structure represented by a general formula (2):

[Chemical formula 2]

(2)

(where X represents a hydrogen atom, a hydroxyl group, an alkyl group, or an acyl group; and $R_1$ to $R_4$ are identical or different alkyl groups)

A hindered amine material represented by a general formula (3), where X is a hydrogen atom, is particularly preferable. The structure improves stability at the time of production.

[Chemical formula 3]

(3)

(where $R_1$ to $R_4$ are the same as in the general formula (2))

Examples of the hindered amine material represented by the general formula (2) include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine 4-benzoyloxy-2,2,6,6-tetramethylpiperidine, 4-methoxy-2,2,6,6-tetramethylpiperidine, and 4-stearyloxy-2,2,6,6-tetramethylpiperidine.

Examples further include 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis (2,2,6,6-tetramethyl-4-piperidine)-carbonate, bis(2,2,6,6- tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, and bis(2,2,6,6-tetramethyl-4-piperidyl)-terephthalate.

Other examples are 1,2-bis(2,2,6,6-tetramethyl-4-piperidyloxy)-ethane, α,α'-bis (2,2,6,6-tetramethyl-4-piperidyloxy)-p-xylene, his (2,2,6,6-tetramethyl-4-piperidyl)tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, and the like. Bis(2,2,6,6-tetramethyl-4-piperidyl)-sebacate is preferable.

[Powdery Aluminum]

1. Content of Powdery Aluminum

The polyacetal resin composition according to the present invention further includes a powdery aluminum. The content of the powdery aluminum is 0.2 to 10 parts by mass with respect to 100 parts by mass of the polyacetal copolymer, preferably 0.3 to 8 parts by mass, and more preferably 0.4 to 6 parts by mass. Controlling the content in these ranges allows for further maintenance of mechanical properties inherent in the resin and display of an excellent appearance.

2. Properties of Powdery Aluminum

The powdery aluminum of the present invention is preferably provided in a particle form and provided appropriately with an oxide layer on a surface thereof. Providing an appropriate oxide layer maintains high reflectance unique to aluminum, and further retains corrosion resistance and aging stability of particles.

Purity of the powdery aluminum of the present invention is not particularly limited. Other metals may be contained as impurities or alloy contents as long as the metals do not significantly interfere with the effects of the present invention. Examples of the impurities or alloy contents may include, for example, Si, Fe, Cu, Mn, Mg, Zn, and the like.

The powdery aluminum of the present invention can be produced in any method, examples of which are known. For instance, aluminum powder may be obtained from atomized powder, cut powder, foil powder, evaporated powder, and other methods, may be selected in advance by first classification and the like. The selected aluminum powder can then be wet ground using a ball mill, attritor, planetary mill, vibration mill, and the like, in some embodiments under coexistence of a grinding medium, such as a grinding aid, solvent, or the like; and can be classified using a sieve in a wet state. Thereafter, the aluminum powder can undergo solid-liquid separation with a filter press. A terminal portion may have a flake shape (uneven) or a curved shape. It is preferable that any grinding medium used herein be minimized because oxygen content in particles can increase when the excess medium is added. Particularly, a preferable oxygen content is 0.05% to 1.0% by weight. The content can be measured in a nondispersive infrared absorption method using an oxygen analyzer.

3. Shape of Powdery Aluminum

The powdery aluminum used in the present invention preferably has a discoidal or scale-like shape. The discoidal or scale-like shape herein refers to that a value of average shape ratio [average particle thickness t/average particle diameter D] is 0.6 or less, preferably 0.4 or less, and more preferably 0.2 or less. Controlling the shape in theses ranges allows good dispersion when the powdery aluminum is melt-kneaded with the polyacetal copolymer, and can effectively improve appearance with a smaller additive amount. It is preferable that the powdery aluminum have a smooth surface without a crack on its periphery, since damage is hard to occur to particles at the time of kneading with the polyacetal copolymer.

The average particle thickness of the present invention can be obtained in a method below, for example. The powdery aluminum is washed with acetone, and dried. The mass w (g) is then measured. A coverage area S ($cm^2$) is measured when the powdery aluminum is evenly floated on a water surface. WCA (water coverage area; S/w) is thus calculated and substituted into an expression (B) below for calculation.

$$\text{Average particle thickness } t(\mu m) = 4000/(S/w) \quad \text{Expression (B)}$$

The average particle diameter D of the present invention represents a value at 50% ($D_{50}$) of a particle diameter distribution measured by a laser-diffraction particle diameter distribution measurer.

4. Size of Powdery Aluminum

The powdery aluminum used in the present invention preferably has an average particle diameter ($D_{50}$) of 3 to 80 μm, more preferably 5 to 50 μm, and particularly preferably 10 to 40 μm. Using the powdery aluminum having a particle diameter of these ranges maintains better production stability at the time of pelletization, and helps the resin composition to have toughness, which is a mechanical property inherent in resin.

Further, the particle diameter distribution Dw/Dn (weight average particle diameter/number average particle diameter) of the powdery aluminum measured by the laser-diffraction particle diameter distribution measurer is preferably 1.1 to 2.0, and more preferably 1.2 to 1.8. Using the powdery aluminum in the particle diameter distribution range maintains production stability and enables a resin composition having good weld properties.

In addition, it is preferable that the average particle thickness of the powdery aluminum meet a condition of the discoidal or scale-like shape with respect to the average particle diameter. The average particle thickness is preferably 0.3 μm or greater, more preferably 0.4 μm or greater, and furthermore preferably 0.5 μm or greater. Using the powdery aluminum having an average particle thickness of these ranges reduces damage to particles at the time of kneading with the polyacetal copolymer, helps to maintain a property balance of strength and toughness, and further improves weld appearance of a molded body.

The property balance of strength and toughness, and lightness can be enhanced depending on a combination. Thus, two or more types of the powdery aluminum from the above-listed particles may be used. In this case, it is preferable that the difference of the average particle diameter of two types of powdery aluminum be 20 μm or greater, and that the difference of the average particle diameter of two types of powdery aluminum having a smallest difference of the average particle diameter be 20 μm or greater.

[Fatty Acid]

The polyacetal resin composition according to the present invention also includes a fatty acid having 10 to 30 carbons. The content of the fatty acid is 0.3 to 10 parts by mass with respect to 100 parts by mass of the powdery aluminum, preferably 0.5 to 8 parts by mass, and more preferably 0.8 to 4 parts by mass. Controlling the content in these ranges modifies a surface of the powdery aluminum, improves stability at the time of mixing with the polyacetal copolymer, and enhances appearance of a molded body.

The fatty acid is a compound represented by a general formula (4) below, for example, and can be obtained by performing hydrolysis of natural fat. Examples of a preferable fatty acid may include oleic acid, lauric acid, myristic acid, palmitic acid, behenic acid, stearic acid, and the like. Particularly preferable fatty acids are oleic acid, behenic acid, and stearic acid.

(4)

(where $R_1$ represents a saturated or unsaturated hydrocarbon)

In order to assist in modifying of the surface of the powdery aluminum, a small amount of thermoset resin may be included. Examples of the thermoset resin include unsaturated polyester resins, epoxy resins, and the like.

[Other Additives]

In some embodiments, it is desirable that the polyacetal resin compositions according to the present invention include a polyalkylene glycol, a hydrazide compound, and/or a colorant.

1. Polyalkylene Glycol

In some embodiments, it is preferable that the polyacetal resin compositions according to the present invention contain a polyalkylene glycol. The content of the polyalkylene glycol is 0.3 to 3 parts by mass with respect to 100 parts by mass of the polyacetal copolymer, preferably 0.5 to 2 parts by mass, and more preferably 0.7 to 1.5 parts by mass. Controlling the content in these ranges increases production stability and further improves toughness.

In the present invention, the polyalkylene glycol may be a copolymer or may contain two or more types of polyalkylene glycols. As the polyalkylene glycol of the present invention, a polyethylene glycol is preferable economically and in view of handling. Particularly, a polyethylene glycol having a number average molecular weight of 800 to 500000 is preferable, a number average molecular weight of 1000 to 20000 is more preferable, and a number average molecular weight of 2000 to 10000 is even more preferable. Employing these range further enhances toughness and lightness. In the present invention, the number average molecular weight of the polyethylene glycol is measured specifically in a method below, using a magnetic resonance spectrometer, for example. The polyethylene glycol to be measured is dissolved for 24 hours in a solvent of HFIP-$d_2$ (D rate: 97%; Wako Pure Chemical Industries, Ltd. 98% assay), and thereby a resin solvent having 1.5% by mass is prepared. Subsequently, peak integration is performed for assignments of oxyethylene components and hydroxyl groups of the resin solvent, using a device of JEOL-400 nuclear magnetic resonance spectrometer (1H: 400 MHz) at a temperature of 55° C. for a cumulated number of 500 times. The number average molecular weight is calculated from the amount of the oxyethylene components with respect to the terminal hydroxyl groups.

2. Hydrazide Compound

In some embodiments, it is preferable that the polyacetal resin compositions according to the present invention contain a hydrazide compound, which can further enhance production stability. An additive amount of the hydrazide compound is 0.03 to 0.25 part by mass with respect to 100 parts by mass of the polyacetal copolymer of the present invention, preferably 0.05 to 0.2 part by mass, and more preferably 0.07 to 0.15 part by mass. The hydrazide compound may be added at the time of pelletization of the above-described polyacetal copolymer, at the time of production of the polyacetal composition, or at both times.

It is preferable to use as the hydrazide compound of the present invention, a dicarboxylic acid dihydrazide represented by a general formula (5) below, for example. Examples of the preferable dicarboxylic acid dihydrazide include malonic acid dihydrazide, succinic acid dihydrazide, glutaric acid dihydrazide, adipic acid dihydrazide, pimelic acid dihydrazide, speric dihydrazide, azelaic acid dihydrazide, sebacic acid dihydrazide, dodecanedioic acid dihydrazide, isophthalic acid dihydrazide, phthalic acid dihydrazide, and the like.

(5)

(where $R_1$ represents a hydrocarbon having a 2 to 20 carbons)

Sebacic acid dihydrazide, dodecanedioic acid dihydrazide, isophthalic acid dihydrazide, and adipic acid dihydrazide are particularly preferable among the above-listed dicarboxylic acid dihydrazides. Sebacic acid dihydrazide and adipic acid dihydrazide are further preferable. In the present invention, two or more types of the hydrazide compounds may be used.

3. Colorant

In some embodiments, a colorant may be added in the present invention to enhance designability. Organic pigments, inorganic pigments, and the like may be used as the colorant. The type of the colorant is not particularly limited, and one type or a combination of different types may be used. Examples of organic pigments include phthalocyanine pigment, condensed azo pigment, soluble azo pigment, quinacridone pigment, dioxazine pigment, isoindolinone pigment, condensed polycyclic pigment, and the like. Examples of inorganic pigments include simple oxides, such as Chinese white, titanium dioxide, Bengal red, chromium oxide, iron black, and the like; sulfides, such as cadmium yellow, cadmium orange, cadmium red, and the like; chromate salts, such as chrome yellow, zinc yellow, chrome vermilion, and the like; ferrocyanides, such as iron blue and the like; silicates, such as ultramarine and the like; and inorganic colorants, such as carbon black, metallic powder, and the like. An additive amount of the colorant is preferably 10 parts by mass or less with respect to 100 parts by mass of the polyacetal copolymer. Controlling the amount in this range further improves appearance of a molded body and retains strength.

4. Other Additives

Further, in some embodiments, it is preferable to use a thermostabilizer in combination with the polyacetal resin composition of the present invention, the thermostabilizer being used in conventional polyacetal resin. An antioxidant, a capture agent of formaldehyde or formic acid, or a combination of the both is effective as the thermostabilizer.

A hindered phenol antioxidant is preferable as the antioxidant. Examples of the hindered phenol antioxidant include n-octadecyl-3-(3'5'-di-t-butyl-4'-hydroxyphenyl)-propionate, n-octadecyl-3-(3'-methyl-5'-t-butyl-4'-hydroxyphenyl)-propionate, n-tetradecyl-3-(3'5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), and triethyleneglycol-bis-(3-(3-t-butyl-5-methyl-4-hydroxyphenyl)-propionate). Examples may further include tetrakis-(methylene-3-(3'5'-di-t-butyl-4'-hydroxyphenyl)propionate-methane, 3,9-bis(2-(3-(3-t-butyl-4-hydroxy-5-methylphenyl)propionyloxy)-1,1-dimethylethyl) 2,4,8,10-tetraoxaspiro(5,5)undecane, N,N'-bis-3-(3'5'-di-t-butyl-4-hydroxyphenol) pripionylhexamethylenediamine, N,N'-tetramethylene bis-3-(3'-methyl-5'-t-butyl-4-hydroxyphenol)propionyldiamine, N,N'-bis-(3-(3,5-di-t-butyl-4-hydroxyphenol)propionyl)hydrazine, N-salicyloyl-N'-salicylidenehydrazine, 3-(N-salicyloyl)amino-1,2,4-triazole, N,N'-bis(2-(3-(3,5-di-butyl-4-hydroxyphenyl) propionyloxy)ethyl)oxyamide, and the like. Among the above-listed hindered phenol antioxidants, triethyleneglycol-bis-(3-(3-t-butyl-5-methyl-4-hydroxyphenyl)-propionate) and tetrakis-(methylene-3-(3'5'-di-t-butyl-4'-hydroxyphenyl)propionatemethane are preferable.

Examples of the capture agent of formaldehyde or formic acid include (i) compounds and polymers containing formaldehyde reactive nitrogen, and (ii) hydroxides of alkali metal and alkaline-earth metal, inorganic acid salts, carboxylates, alkoxides, and the like.

Examples of (i) compounds containing formaldehyde reactive nitrogen include (1) dicyandiamides, (2) amino-substituted triazines, (3) cocondensations of amino-substituted triazine and formaldehyde, and the like.

Examples of (2) amino-substituted triazines include guanamine(2,4-diamino-sym-triazine), melamine(2,4,6-triamino-sym-triazine), N-butylmelamine, N-phenylmelamine, N,N-diphenylmelamine, N,N-diallylmelamine, N,N',N''-triphenylmelamine, N-methylolmelamine, N,N'-dimethylolmelamine, N,N',N''-trimethylolmelamine, and benzoguanamine(2,4-diamino-6-phenyl-sym-triazine).

Examples further include 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine (ammelite), 2-oxy-4,6-diamino-sym-triazine (ammeline), N,N',N'-tetracyanoethylbenzoguanamine, and the like.

Examples of (3) cocondensations of amino-substituted triazine and formaldehyde may include melamine-formaldehyde polycondensations and the like. Particularly, dicyandiamide, melamine, and melamine-formaldehyde polycondensations are preferred.

Further, examples of (i) polymers containing a formaldehyde reactive nitrogen group also include (1) polyamide resin; (2) a polymer obtained by polymerizing acrylamide and a derivative thereof, or acrylamide, a derivative thereof, and another vinyl monomer, in the presence of a metal alcoholate; (3) a polymer obtained by polymerizing acrylamide and a derivative thereof, or acrylamide, a derivative thereof, and another vinyl monomer, in the presence of radical polymerization; and (4) a polymer containing a nitrogen group, such as amine, amide, urea, urethane, and the like.

Examples of (1) polyamide resin may include nylon 4-6, nylon 6, nylon 6-6, nylon 6-10, nylon 6-12, nylon 12, and the like; and copolymers of the above-listed materials, such as nylon 6/6-6, nylon 6/6-6/6-10, nylon 6/6-12, and the like. An example of (2) a polymer obtained by polymerizing acrylamide and a derivative thereof, or acrylamide, a derivative thereof, and another vinyl monomer, in the presence of a metal alcoholate may be a poly-β-alanine copolymer. The polymers and copolymers can be produced, for example, in methods described in Japanese Examined Patent Publication No. 116-12259 (corresponding to a specification of U.S. Pat. No. 5,015,707), Japanese Examined Patent Publication No. H5-87096, Japanese Examined Patent Publication No. H5-47568, and Japanese Patent Laid-open Publication No. 113-234729.

When the polyacetal resin composition of the present invention is used for interior and exterior design parts, it is preferable to use an ultraviolet absorber selected from benzotriazole and anilide oxalate ultraviolet absorbers, which are used for conventional polyacetal resin. One ultraviolet absorber may be used, or a combination of two or more types of ultraviolet absorbers may be used.

Examples of the benzotriazole ultraviolet absorbers include 2-(2'-hydroxy-5'-methyl-phenyl)benzotriazole, 2-(2'-hydroxy-3',5'-di-t-butyl-phenyl)benzotriazole, 2-(2'-hydroxy-3',5'-di-isoamyl-phenyl)benzotriazole, 2-[2'-hydroxy-3',5'-bis-(α,α-dimethylbenzyl)phenyl]benzotriazole, 2-(2'-hydroxy-4'-octoxyphenyl)benzotriazole, and the like.

Examples of the anilide oxalate ultraviolet absorbers include 2-ethoxy-2'-ethyloxalic acid bis anilide, 2-ethoxy-5-t-butyl-2'-ethyloxalic acid bis anilide, 2-ethoxy-3'-dodecyloxalic acid bis anilide, and the like.

In addition, in some embodiments, a lubricant, a variety of inorganic fillers, other thermoplastic resin, a softener, a crystal nucleating agent, a parting agent, and the like, which are used for conventional polyacetal resin, can be used as desired for the polyacetal resin composition of the present invention within a scope of a purpose of the present invention.

[Production of Composition]

The polyacetal resin compositions of the present invention, mainly including the polyacetal copolymer, the hindered amine material, the powdery aluminum, and the fatty acid can be produced in a number of manners, including by using a commonly used melt kneader. Examples of melt kneaders include a kneader, roll mill, single-axis extruder, twin-axis extruder, multi-axis extruder, and the like. A processing temperature is preferably 180° to 230° C. In order to maintain quality and an acceptable work environment, it is preferable to perform substitution with an inert gas or deaeration with single or multiple vents. Further, in order to increase even dispersibility of the powdery aluminum with the polyacetal copolymer, a partial or entire amount of polyacetal copolymer pellets may be ground; and powder obtained therefrom and the powdery aluminum may be mixed in advance, and then melt-mixed. When pellets are used, an disperging agent may be used to increase the dispersibility of the powdery aluminum. Examples of disperging agent include aliphatic hydrocarbons and aromatic hydrocarbons, modified substance and a mixture of the above-listed substances (liquid paraffin, mineral oil, and the like), polyol fatty acid esters, and the like.

When the polyacetal resin composition of the present invention is produced, it is preferable that the powdery aluminum and the fatty acid be pre-mixed. Thereby, a surface of the powdery aluminum can efficiently be reformed with a small amount of addition. The pre-mixing can be performed in any manner, including by using a commonly used mixer. Examples of mixers include a ribbon blender, Henschel mixer, tumbler mixer, and the like. Further, depending on the melting point of the fatty acid used, it is preferable that the mixer have a heating function in order to efficiently reform the surface. Furthermore, it is preferable that the pre-mixing be performed under moderate conditions, so as not to destroy the diameter or shape of particles of the powdery aluminum.

When the polyacetal resin composition of the present invention is produced, it is preferable that the polyacetal copolymer and the hindered amine material be pre-melt-kneaded. The pre-melt-kneading can be performed in a variety of manners, including by using a commonly used melt kneader. Examples of melt kneaders include a kneader, roll mill, single-axis extruder, twin-axis extruder, multi-axis extruder, and the like. The processing temperature is preferably 180° to 230° C. In order to maintain quality and an acceptable work environment, it is preferable to perform substitution with an inert gas and/or deaeration with single or multiple vents.

It is preferable that the polyacetal resin composition of the present invention be produced in a process of pre-mixing the powdery aluminum and the fatty acid, a process of pre-melt-kneading the polyacetal copolymer and the hindered amine material, and a process of mixing the mixtures obtained from the two processes. Thereby, appearance and lightness of a molded body can be enhanced.

In addition, when the polyacetal resin composition of the present invention is produced, it is preferable that the powdery aluminum be sufficiently dried in advance before being mixed with the polyacetal copolymer. When the powdery aluminum and the fatty acid are pre-mixed as described above, water or extra air is prevented from being brought into the mixture as much as possible before melt-kneading, such as by heating and mixing the dried powdery aluminum and the fatty acid in a nitrogen atmosphere, and melt-kneading the mixture with the polyacetal copolymer in the nitrogen atmosphere. A dry state herein refers to a state in which, when the powdery aluminum having a mass $W_1$ (g) before mixing is dried in an oven at a temperature of 80° C. for two hours, and the dried powdery aluminum has a mass $W_2$ (g), $[(W_1-W_2)/W_2]$ is 0.0015 or less, preferably 0.001 or less. Thereby, a higher production stability and productivity of the polyacetal resin composition can be maintained.

[Molding]

A molded body formed from the polyacetal resin composition of the present invention can be produced in a variety of methods, including known molding methods, such as, for example, extrusion molding, injection molding, vacuum molding, blow molding, injection compression molding, decorative molding, gas-assist injection molding, shot injection molding, low-pressure molding, ultra-thin injection molding (ultra-high-speed injection molding), in-mold composite molding (insert molding, outsert molding), and the like. Particularly, injection molding and injection compression molding, and a combination of the two molding methods and in-mold composite molding are preferable, in light of appearance quality, production stability, economic efficiency, and the like.

Further, when the present composition and a variety of resins containing rubbers or elastomers are bonded (any method can be employed, including ultrasonic bonding, high-frequency bonding, hot plate bonding, hot press molding, multi-layer injection molding, multi-layer blow molding, and the like), so as to provide a molded body having two or more layers, excellent performance of the variety of resins (impact resistance, slidability, chemical resistance, and the like) can be achieved, and the molded body is provided with appearance having an excellent designability.

[Use]

A molded body obtained in the method above according to the present invention can be used, for example, for a design part, in particular, having a mechanism portion or a sliding portion. Examples of uses include parts used for office automation ("OA") equipment, audio, video, and information devices, and communication devices; industrial parts used for office furniture and housing equipment; vehicle interior and exterior parts; and the like. It is particularly preferable in application to vehicle interior parts, including inner handles, shift knobs, levers, switches, buttons, and the like. Further, it is preferable to use the polyacetal resin composition of the present invention as an external appearance part to add designability by using a mold partially or entirely provided with a grain at the time of molding, since the composition provides outstanding effects, including excellent transferability on a grain surface, maintenance of high lightness, and the like.

Embodiments

The present invention is explained specifically below in embodiments and comparative examples.

(1) Main Raw Materials

[Prepared Polyacetal Copolymer/Component A]

A polyacetal copolymer or a prepared polyacetal copolymer (hereinafter referred to as "component A"), which was used in the embodiments and the comparative examples, is explained below. The prepared polyacetal copolymer was the polyacetal copolymer to which an additive and the like were added.

A self-cleaning type twin-axis paddle continuous mixing reactor with a jacket that allows a heat medium to pass (screw diameter: 3 inches; L/D=10) was adjusted to a temperature of 80° C. Trioxane as the main monomer at a rate of 2,625 g/hr, 1,3-dioxolan as the comonomer at a rate of 12 g/hr, and methylal as the chain transfer agent (impurities were reduced for all substances) were continuously fed to the reactor through a static mixer (Noritake Co., Limited; T type; element number: 21). A cyclohexane solution having 1% by weight of boron trifluoride di-n-butyl etherate was used as a polymerization catalyst. Polymerization was performed in which the catalyst was added at $2.0 \times 10^{-5}$ mol relative to 1 mol of the trioxane, and thereby polymerized flakes were obtained. The chain transfer agent was controlled to 2 to 5 g/hr, in accordance with an MFR (melt mass flow rate; g/10 minutes) of the target prepared polyacetal copolymer.

The obtained polymerized flakes were finely ground, and then placed and mixed in an aqueous solution having 1% of triethylamine. After being deactivated, the polymerization catalyst was filtered, washed, and dried, and thereby an intermediate polymer was obtained. Triethyl (2-hydroxyethyl) ammonium formate as a quaternary ammonium compound was added at 20 ppm in terms of the nitrogen amount using the above-described expression (A), with respect to 1 part by weight of the obtained rough polymer. The mixture was evenly mixed, and dried at a temperature of 120° C. for three hours. Thereby, a dried polymer was obtained.

Figure 1:
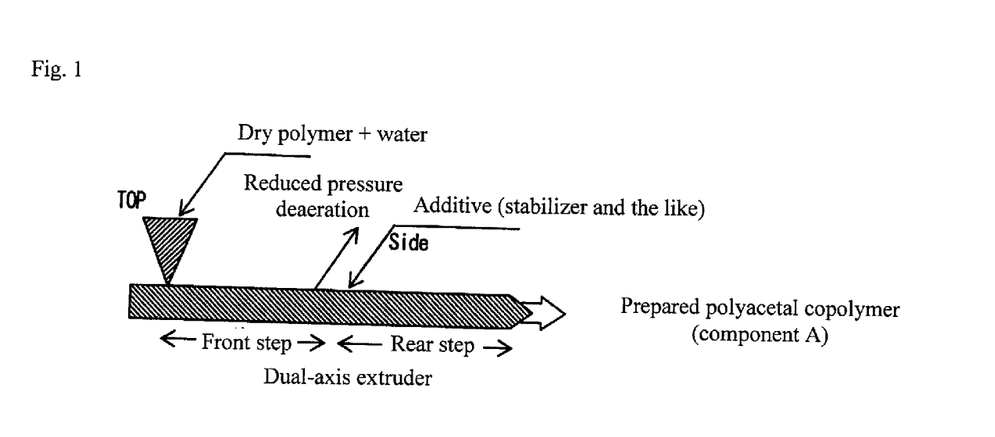
FIG. 1 illustrates a process for obtaining a prepared polyacetal copolymer (component A) from a dry polymer.

As shown in FIG. 1, the dried polymer was fed from a top feeder to a front step portion of a screw-type twin-axis extruder with vents (Plastic Kogyo Ltd.; BT-30; L/D=44; set temperature: 200° C.; revolution: 80 rpm). To the dried polymer, 0.5% by mass of water was added. Then, a polymer terminal was stabilized for an average residence time of 1 minute, and pressure reduction and deaeration were performed. Subsequently, 0.05 part by mass of polyamide 66 as a thermostabilizer, 0.1 part by mass of a calcium stearate, and 0.5 part by mass of 2-[2'-hydroxy-3',5'-bis-(α,α-dimethylbenzyl)phenyl]benzotriazole, with respect to 100 parts by mass of the dried polymer, and further additives shown in Table 1 were added from a side feeder to a rear step portion. After being melt-mixed for an average residence time of 1 minute, the mixture was pelletized and dried at a temperature of 80° C. for three hours. Thereby, intermediate pellets including the prepared polyacetal copolymer (component A) were obtained. Oxygen was prevented from mixing as much as possible in the processes from feeding of the raw materials to obtaining of the intermediate pellets. An MFR (melt mass flow rate; g/10 minutes) of the obtained prepared polyacetal copolymer was measured under ISO 1133 condition D (load: 2.16 kg; cylinder temperature: 190° C.). The results are shown in Table 1.

[Table 1]

The prepared polyacetal copolymers A1 to A18 shown in Table 1 were dissolved for 24 hours in a solvent of HFIP-d$_2$ (D rate: 97%; Wako Pure Chemical Industries, Ltd. 98% assay), and thereby a resin solvent having 1.5% by mass was prepared. Then, peak integration was performed for assignments of oxymethylene components and oxyethylene components of the resin solvent, using a device of JEOL-400 nuclear magnetic resonance spectrometer (1H: 400 MHz) at a temperature of 55° C. for a cumulated number of 500 times. A copolymerization amount of the comonomer components was then obtained. When the oxymethylene components were converted into trioxane (formaldehyde trimer), the comonomer components were 3.5 to 4.5 mol with respect to 100 mol of trioxane.

[Prepared Polyacetal Homopolymer/Component A']

A polyacetal homopolymer or a prepared polyacetal homopolymer, which was used in the comparative examples, is explained below. The prepared polyacetal homopolymer was the polyacetal homopolymer to which an additive and the like were added.

Figure 3:
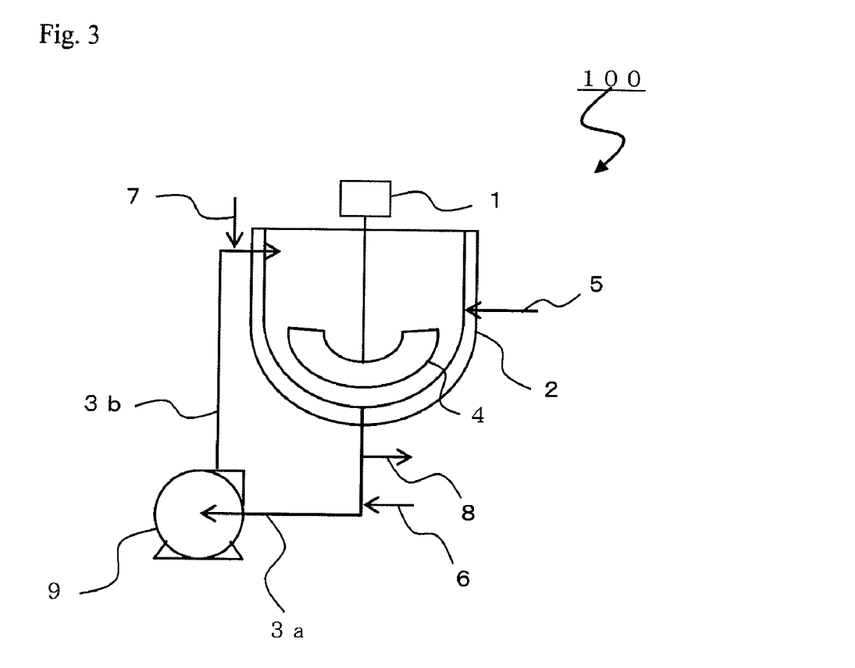
FIG. 3 illustrates a polymerization device for a polyacetal homopolymer used as comparative examples.

A polymerization device 100 as shown in FIG. 3 was prepared. In the polymerization device 100, slurry circulation lines 3a and 3b were provided to a 5 L tank-type polymerizer 2 with a jacket that allows a heat medium to pass. The polymerizer 2 was provided with a mixer driven by a mixing motor 1 having mixing paddles 4. The polymerizer 2 was filled with 2 L of n-hexane. The slurry circulation lines 3a and 3b together have a size of 6φ×2.5 m. The n-hexane was circulated by a slurry circulation pump 9 at a rate of 20 L/hr. A dehydrated formaldehyde gas was directly supplied from a supply line 5 to the polymerizer 2 at a rate of 200 g/hr. Dimethyl distearyl ammonium acetate was used as a polymerization catalyst, which was supplied to a circulation line immediately before a reactor through a supply line 7. Further, a chain transfer agent (acetic anhydride) was added from a supply line 6 to the circulation line 3a, the chain transfer agent compensating a slurry for an amount taken out from the system through a line 8. While the chain transfer agent was continuously supplied, polymerization was performed at a temperature of 58° C., and thereby a polymerized slurry containing an intermediate polymer was obtained. The added polymerization catalyst and the chain transfer agent were controlled in accordance with an MFR of the target prepared polyacetal homopolymer.

The obtained slurry was reacted with a mixture of hexane and acetic anhydride having a ratio of 1 to 1 (volume ratio) at a temperature of 140° C. for two hours. A molecular terminal was stabilized through acetylation. The polymer after the reaction was filtered and then dried in a reduced pressure dryer at a temperature of 80° C. for three hours under a reduced pressure of 2 mmHg or less. Thereby, polyacetal homopolymer powder was obtained. Thereafter, 0.05 part by mass of polyamide 66 as a thermostabilizer, 0.5 part by mass of 2-[2'-hydroxy-3',5'-bis-(α,α-dimethylbenzyl)phenyl]benzotriazole, and additives shown in Table 1 were added. After being melt-mixed for an average residence time of 1 minute, the mixture was pelletized and dried at a temperature of 80° C. for three hours. Thereby, intermediate pellets including the prepared polyacetal homopolymer (component A') were obtained. Oxygen was prevented from mixing as much as possible in the processes from feeding of the raw materials to obtaining of the intermediate pellets. An MFR (melt mass flow rate; g/10 minutes) of the obtained prepared polyacetal homopolymer was measured under ISO 1133 condition D (load: 2.16 kg; cylinder temperature: 190° C.).

[Prepared Aluminum/Component B]

Powdery aluminum or prepared aluminum (hereinafter referred to as "component B"), which was used in the embodiments and the comparative examples, is shown in Table 2. The prepared aluminum was the powdery aluminum treated with a fatty acid.

The powdery aluminum was obtained by classifying a variety of commercially available aluminum powder according to a target particle diameter using a standard sieve, and by re-preparing the aluminum. A detailed distribution was obtained using a laser-diffraction particle diameter distribution measurer (Shimadzu Corporation; SALD-1100). An average particle diameter ($D_{50}$) of the powdery aluminum was indicated with a value at 50% of the particle diameter distribution. Dw/Dn was also calculated from the particle diameter distribution obtained from the measurer.

An average particle thickness of the powdery aluminum was calculated as below. The powdery aluminum was washed with acetone, and dried. The mass w (g) was measured. A coverage area S ($cm^2$) was measured when the powdery aluminum was evenly floated on a water surface. WCA (water coverage area; S/w) was thus calculated and substituted into the expression (B) below to calculate the average particle thickness of the powdery aluminum.

$$\text{Average particle thickness } t(\mu m) = 4000/(S/w) \qquad \text{Expression (B)}$$

From the value above and the average particle diameter ($D_{50}$), an average shape ratio [average particle thickness t/average particle diameter ($D_{50}$)] was calculated.

The powdery aluminum having an oxygen content of 0.1% to 0.5% by mass was used for all B1 to B22. To obtain the oxygen content, an oxygen amount in the powdery aluminum was measured by using a nitrogen/oxygen analyzer (Horiba, Ltd.; EMGA-620W) in a nondispersive infrared absorption method. Further, the powdery aluminum was dried, such that the above-described [$(W_1-W_2)/W_2$] was 0.001 or less. Unless otherwise described, the prepared aluminum indicated in Table 2 was prepared by mixing the dried powdery aluminum and a fatty acid in a ribbon blender with a jacket (80° C.; 80 rpm) for three minutes while nitrogen was being purged.

[Table 2]

(2) Polyacetal Resin Composition

Figure 2:
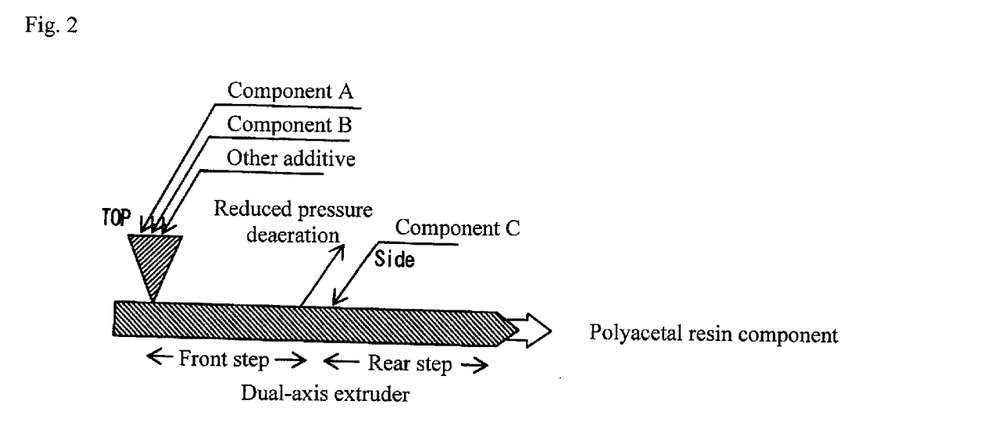
FIG. 2 illustrates a process for obtaining a polyacetal resin composition from the component A and a component B.

The above-described component A and component B were melt-mixed and pelletized in a nitrogen purged atmosphere at a combination ratio shown in Tables 3 to 6, and then dried at a temperature of 80° C. for three hours. Thereby, a polyacetal resin composition (final pellets) was obtained. As shown in FIG. 2, a screw-type twin-axis extruder with vents (Plastic Kogyo Ltd.; BT-30; L/D=44; set temperature: 200° C.; revolution: 80 rpm) was used for melt-mixing. The raw materials were fed while being controlled, such that the torque of the extruder was constantly at 25 ampere. Unless otherwise described, 0.1 part by mass of adipic acid dihydrazide, which is a hydrazide compound, as a component C was added from a side feeder, with respect to 100 parts by mass of the polyacetal copolymer.

(3) Evaluation Samples

[Dumbbell for Tensile Property Evaluation]

In order to evaluate strength and toughness, which are mechanical property indexes, a versatile test piece in accordance with ISO 527-1, 2 was molded from the above-described final pellets, by using a molder (Toshiba Machine Co., Ltd.; IS-100E; cylinder temperature: 200° C.; mold temperature: 80° C.; cooling time: 30 seconds). It was confirmed that a molded product had no short shot or flash. The molded product was then provided as a test piece for evaluation.

[Dumbbell for Weld Property Evaluation]

In order to evaluate a weld property, which is a mechanical property index, a dumbbell for weld property evaluation was molded from the above-described final pellets in a manner similar to above, by using a mold designed to have injection gates on both sides of a shape same as the above-described versatile test piece and a welded portion between gauge lines of the dumbbell. It was confirmed that a molded product had no short shot, burr, or sink and that the molded product had a mass of ±0.3% or less with respect to that of the dumbbell test piece for tensile property evaluation. The product was then provided as a dumbbell test piece for weld property evaluation.

[Bar for Appearance Evaluation]

In order to evaluate appearance, continuous molding was performed for 2,000 shots using the final pellets on a full automatic molder (Toyo Machinery & Metal Co., Ltd.; TI-30G; cylinder temperature: 200° C.; mold temperature: 80° C.; cooling time: 15 seconds). A molded body was obtained as a strip sample, by using a mold having 40 mm in length, 15 mm in width, and 2 mm in depth, and being provided with a grain finish on an evaluation surface (Tanazawa Hakkosha Co., Ltd.; grain pattern: H-189; grain depth: 10 μm). The last 10 pieces of the 2,000 shots were obtained, and left in an oven having a temperature of 120° C. for 10 days. Thereby, a sample for appearance evaluation was provided. The sample which was continuously molded and left in heat was evaluated, so as to perform a simulated evaluation of molding stability in mass production and a degree of appearance change after a long time elapse.

(4) Evaluation

[Production Stability]

Production stability of the above-described polyacetal resin composition was evaluated by observing a strand in the extruder, particularly near a dice, at the time of melt-mixing, for an impact on stability and a work environment. The evaluation was "very good" when the strand discharged from the dice was stable similar to or more than the polyacetal resin composition of the comparative example 3, which included no powdery aluminum; "good" when, in contrast, smell, discharges, and the like were generated slightly more; "fair" when a gas was generated, or short mold, vent flow, and other problems were observed; and "bad" when pelletization was unstable.

[Productivity]

Production productivity of the above-described polyacetal resin composition was evaluated by comparing an average pelletization amount per unit hour with that of the polyacetal resin composition of the comparative example 3 including no powdery aluminum. The comparison was classified into five levels of 90% or more, 80% or more and less than 90%, 70% or more and less than 80%, 60% or more and less than 70%, and less than 60%. In view of polyacetal resin productivity, 60% or less was deemed inferior.

[Mechanical Properties]

Mechanical properties of the present invention were evaluated in aspects of strength, toughness, and a weld property. A tensile test was performed based on ISO 527-1, 2, to measure strength (tensile strength), elongation (tensile elongation), and weld elongation. The strength was measured as yield stress, and the elongation was measured as elongation between the gauge lines at the time of fracture. A cross-head speed was performed at 5 mm/minutes. Measurement was performed at n=5. An obtained average value was provided as an evaluation value.

1. Tensile Strength

Evaluation results demonstrated that strength values of the embodiments were all 60% or above of a strength value of the polyacetal resin composition of the comparative example 3 including no powdery aluminum.

2. Tensile Elongation

Results were evaluated based on a percentage relative to elongation of the polyacetal resin composition of the comparative example 3 including no powdery aluminum. When the percentage was 60% or below, the mechanical property inherent in polyacetal resin was evaluated inferior.

3. Weld Elongation

Results were evaluated based on a percentage relative to weld elongation of the polyacetal resin composition of the comparative example 3 including no powdery aluminum. When the percentage was 60% or below, the mechanical property inherent in polyacetal resin was evaluated inferior.

[Appearance]

1. Visual Evaluation

Appearance of the present invention was evaluated using samples for appearance evaluation at n=10, by visually checking grain transferability, surface condition, silver streaks, color change, and the like. The evaluation was "very good" when 10 pieces were good; "good" when 8 to 9 pieces were good; "fair" when 7 pieces were good; and "bad" when 6 or less pieces were good because the productivity is low. Further, the welded portion of the dumbbell test piece for weld property evaluation was visually checked. A weld line was checked because, depending on a purpose of a molded body, there may be a case in which there is no flexibility in gate positions, and thus the weld line cannot be excluded from a design surface. The evaluation was "very good" when the weld line was hardly observed; "good" when a thin line appeared; and "fair" when a thick line appeared.

2. Lightness

Lightness (L* value) was measured at n=5 of samples for appearance evaluation having a good visual appearance evaluation, by using a color-difference meter (Gardner; Color Guide), and then average values were calculated. The values of the embodiments were all 50 or above (lightness of samples of the comparative example 3 including no powdery aluminum was 40, for reference). Further, the lower the L* value was, the lower the lightness was.

[Table 3]
[Table 4]
[Table 5]
[Table 6]

(5) Evaluation Results

Embodiments 1 to 11 and Comparative Examples 1 to 7

Table 3 shows the components A (prepared polyacetal) and the components B (prepared aluminum) in the polyacetal resin compositions of the embodiments 1 to 11 and the comparative examples 1 to 7, as well as the evaluation results. In the comparative example 1, in which the polyacetal homopolymer was used, a strand surface was very bad, and many blisters and strand breakages were generated. Thus, production was unstable, and final pellets for evaluation were not available. The results in the table demonstrated that the polyacetal copolymers within the range of the present invention had an excellent balance in production stability, mechanical properties, appearance of molded bodies, and the like. The polyacetal resin compositions of the embodiments 7 and 8 and the comparative examples 4 and 5 were produced in a similar manner to the embodiment 2, except that an additive amount of the component B was as shown in the table with respect to 100 parts by mass of the polyacetal resin composition. Further, even when two types of hindered amine material were used together or a type of fatty acid was changed within the range of the present invention, it is demonstrated that the similar effects were achieved. Furthermore, using the preferable hindered amine material of the present invention allows maintenance of excellent production stability.

Embodiments 12 to 27

Table 4 shows the components A (prepared polyacetal) and the components B (prepared aluminum) in the polyacetal resin compositions of the embodiments 12 to 27, as well as the evaluation results. The embodiment 2 and the above-listed embodiments demonstrated that controlling the compositions in preferable combination ranges of the present invention achieved an excellent balance in production stability, mechanical properties, appearance of molded bodies, and the like. With respect to the MFR of the polyacetal copolymer, it is demonstrated in the embodiments 2 and 12 to 15 that selecting preferable ranges of the present invention allowed good maintenance of high productivity and excellent weld property. With respect to the additive amount of alkylene glycol, it is demonstrated in the embodiments 2 and 16 to 19 that selecting a preferable range of the present invention allowed maintenance of mechanical properties and lightness of the molded bodies. With respect to the molecule weight of alkylene glycol, it is demonstrated in the embodiments 11 and 20 to 23 that selecting a preferable range of the present invention allowed good maintenance of property balance and lightness of the molded bodies. With respect to the additive amount of the hydrazide compound, it is demonstrated in the embodiments 2 and 24 to 27 that selecting a preferable range of the present invention allowed good maintenance of production stability and toughness. The polyacetal resin compositions in the embodiments were produced in a similar manner to the embodiment 2, except that the additive amount of the hydrazide compound was as shown in the table with respect to 100 parts by mass of the polyacetal resin composition.

Embodiments 28 to 43

Table 5 shows the components A (prepared polyacetal) and the components B (prepared aluminum) in the polyacetal resin compositions of the embodiments 28 to 43, as well as the evaluation results. The embodiment 2 and the above-listed embodiments demonstrated that controlling the compositions in preferable combination ranges of the present invention achieved an excellent balance in production stability, mechanical properties, appearance of molded bodies, and the like. With respect to the shape of the powdery aluminum, it is demonstrated in the embodiments 2, 28 to 31, and 34 that selecting a preferable range of the present invention allowed good maintenance of appearance of the molded bodies. With respect to the particle diameter of the powdery aluminum, it is demonstrated in the embodiments 2 and 32 to 35 that controlling the particle diameter in a preferable range of the present invention allowed good maintenance of production stability and toughness. With respect to the particle diameter distribution of the powdery aluminum, it is demonstrated in the embodiments 2 and 36 to 38 that employing a preferable particle diameter distribution of the present invention allowed good maintenance of productivity and weld elongation. With respect to the thickness of the powdery aluminum, it is demonstrated in the embodiments 2 and 39 to 42 that controlling the thickness in a preferable range of the present invention allowed good maintenance of appearance of the welded portions of the molded bodies. It is further demonstrated in the embodiments 2 and 43 that using two types of powdery aluminum having a difference of the average particle diameter of 20 μm or greater together enhanced a property balance of toughness and rigidity.

Embodiments 44 to 47

Table 6 shows the components A (prepared polyacetal) and the components B (prepared aluminum) in the polyacetal resin compositions of the embodiments 44 to 47, as well as the evaluation results. The embodiment 2, 34, and 44 to 47 demonstrated that obtaining the polyacetal resin compositions using a preferable method of the present invention allows the obtained polyacetal resin compositions to maintain good production stability, weld property, and lightness of molded bodies. The polyacetal resin compositions of the embodiments 44 and 45 were produced in a similar manner to the embodiments 2 and 34, except that the components B (prepared aluminum) were conditioned, such that $[(W_1-W_2)/W_2]$ exceeded 0.002 within a range of $[(W_1-W_2)/W_2]$ of 0.0015 or less, and then the components B were melt-kneaded with the components A (prepared polyacetal). Further, the composition in the embodiments 46 and 47 was the same as that in the embodiments 2 and 34. The components A (prepared polyacetal) and the components B (prepared aluminum) were not pre-mixed. Raw materials, such as the polyacetal copolymer, stabilizer, hindered amine material, powdery aluminum, fatty acid, and the like, were respectively fed and melt-kneaded for production.

Embodiment 48 and Comparative Example 8

Figure 4:
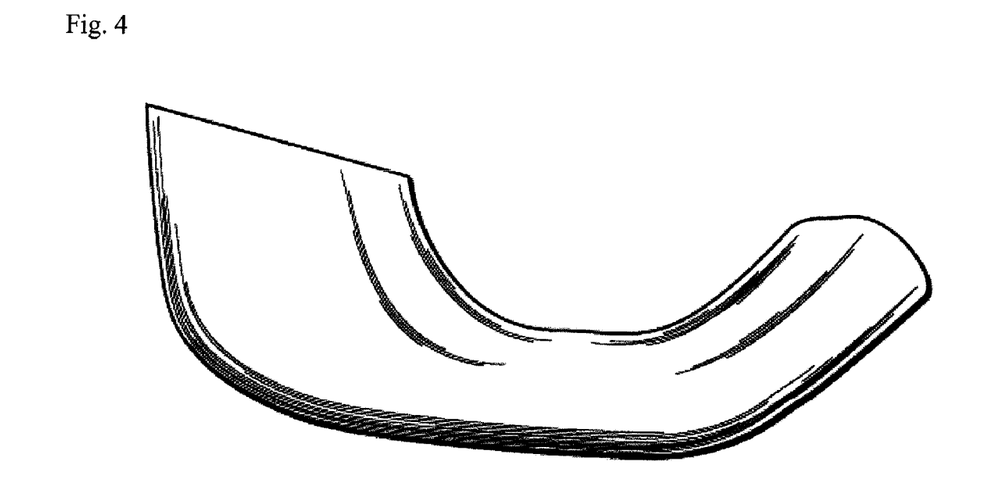
FIG. 4 illustrates a vehicle inner handle molded in embodiments and the comparative examples.

A vehicle inner handle was molded using the polyacetal resin composition obtained in the embodiment 2. The inner handle had a shape as shown in FIG. 4, a grain (Tanazawa Hakkosha Co., Ltd.; grain pattern: H-130; shot blast) on a design surface, and a rib on a rear side. A 350-ton injection molder was used for molding at a resin temperature of 200° C. and a mold temperature of 90° C. An appearance of an obtained molded body was observed. From the results, when the polyacetal resin composition of the present invention (embodiment 48) was used, the molded body was obtained in which the grain was transferred well on the design surface, though a thin weld line was confirmed on the rear surface. In addition, a vehicle inner handle was molded using the polyacetal resin composition obtained in the comparative example 6, in a similar manner to the embodiment 48. An obtained molded body (comparative example 8) had a bad grain transfer on a design surface and a clear weld line on a rear of the design surface. From the results, it is confirmed that a good vehicle inner handle was obtained from the polyacetal resin composition of the present invention.

The polyacetal resin compositions according to the present invention are eco-friendly and capable of maintaining mechanical properties inherent in the resin and of stably providing a molded body having an excellent appearance. Thus, the polyacetal resin compositions are suitable as a design part member.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

TABLE 1

| Component A | MFR of prepared polyacetal g/10 min. | Additives other than a thermostabilizer a * | Added part by mass | b ** | Added part by mass |
|---|---|---|---|---|---|
| A1 | 9 | — | — | — | — |
| A2 | 9 | a1 | 0.25 | — | — |
| A3 | 9 | a1 | 0.5 | — | — |
| A4 | 9 | a1 | 1.5 | — | — |
| A5 | 9 | a1 | 2.5 | — | — |
| A6 | 2 | a1 | 0.5 | — | — |
| A7 | 3 | a1 | 0.5 | — | — |
| A8 | 30 | a1 | 0.5 | — | — |
| A9 | 45 | a1 | 0.5 | — | — |
| A10 | 9 | a1 | 0.5 | 6000 | 1 |
| A11 | 9 | a1 | 0.5 | 6000 | 0.5 |
| A12 | 9 | a1 | 0.5 | 6000 | 2 |
| A13 | 9 | a1 | 0.5 | 6000 | 3 |
| A14 | 9 | a1 | 0.5 | 400 | 0.5 |
| A15 | 9 | a1 | 0.5 | 1000 | 0.5 |
| A16 | 9 | a1 | 0.5 | 20000 | 0.5 |
| A17 | 9 | a1 | 0.5 | 1000000 | 0.5 |
| A18 | 9 | a1/a2 | 0.25/0.25 | — | — |
| A19 | 9 | a2 | 0.5 | — | — |
| A' | 9 *** | a1 | 0.5 | — | — |

* a1 - Hindered amine material: bis (2,2,6,6-tetramethyl-4-piperidyl)-sebacate (Sanol LS-770/X = H)
* a2 - Hindered amine material: 1,2,3,4-butanetetracarboxylic acid, 1,2,2,6,6-pentamethyl-4-piperidinol, b,b,b',b'-tetramethyl-3,9-(2,4,8,10-tetraoxaspiro [5,5] undecane) diethanol condensation (Adecastab LA-63/X = CH3)
** b - alkylene glycol; polyethyleneglycol or polyethylene oxide (numbers are number average molecular weight)
*** MFR of prepared polyacetal homopolymer (others are of prepared polyacetal copolymer)

TABLE 2

| Component B | Particle size μm | Thickness μm | Average shape ratio Thickness/particle size | Particle size distribution Dw/Dn | Fatty acid Type * | Part by mass ** |
|---|---|---|---|---|---|---|
| B1 | 20 | 0.7 | 0.04 | 1.2 | — | — |
| B2 | 20 | 0.7 | 0.04 | 1.2 | 1 | 0.5 |
| B3 | 20 | 0.7 | 0.04 | 1.2 | 1 | 2 |
| B4 | 20 | 0.7 | 0.04 | 1.2 | 1 | 8 |
| B5 | 20 | 0.7 | 0.04 | 1.2 | 1 | 12 |
| B6 | 20 | 6 | 0.30 | 1.2 | 1 | 2 |
| B7 | 20 | 10 | 0.50 | 1.2 | 1 | 2 |
| B8 | 50 | 6 | 0.12 | 1.2 | 1 | 2 |
| B9 | 50 | 22 | 0.44 | 1.2 | 1 | 2 |
| B10 | 2 | 0.7 | 0.35 | 1.2 | 1 | 2 |
| B11 | 5 | 0.7 | 0.14 | 1.2 | 1 | 2 |
| B12 | 50 | 0.7 | 0.01 | 1.2 | 1 | 2 |
| B13 | 100 | 0.7 | 0.01 | 1.2 | 1 | 2 |
| B14 | 20 | 0.7 | 0.04 | 1.1 | 1 | 2 |
| B15 | 20 | 0.7 | 0.04 | 1.8 | 1 | 2 |
| B16 | 20 | 0.7 | 0.04 | 2.0 | 1 | 2 |
| B17 | 20 | 4 | 0.20 | 1.2 | 1 | 2 |
| B18 | 20 | 2 | 0.10 | 1.2 | 1 | 2 |
| B19 | 20 | 0.4 | 0.02 | 1.2 | 1 | 2 |
| B20 | 20 | 0.2 | 0.01 | 1.2 | 1 | 2 |
| B21 | 20 | 0.7 | 0.04 | 1.2 | 2 | 2 |
| B22 | 20 | 0.7 | 0.04 | 1.2 | 3 | 2 |

* Fatty acid type 1: stearic acid
Fatty acid type 2: oleic acid
Fatty acid type 3: behenic acid
** Fatty acid part by mass: Content part by mass with respect to 100 part by mass of powdery aluminum

TABLE 3

| | Component A | Component B Component | Part by mass* | Component C | Production stability Stability | Productivity | Mechanical properties Tensile strength MPa | Tensile elongation % | Weld line % | Appearance Molding appearance | Welded portion | Lightness |
|---|---|---|---|---|---|---|---|---|---|---|---|---|
| Embodiment 1 | A2 | B3 | 4 | 0.1 | Good | 90% or more | 51 | 47 | 23 | Good | Good | 61 |
| Embodiment 2 | A3 | B3 | 4 | 0.1 | Very good | 90% or more | 60 | 45 | 22 | Very good | Good | 61 |
| Embodiment 3 | A4 | B3 | 4 | 0.1 | Very good | 90% or more | 58 | 43 | 21 | Very good | Good | 61 |
| Embodiment 4 | A18 | B3 | 4 | 0.1 | Good | 80-90% | 58 | 44 | 22 | Very good | Good | 61 |
| Embodiment 5 | A3 | B21 | 4 | 0.1 | Very good | 90% or more | 60 | 45 | 22 | Very good | Good | 61 |
| Embodiment 6 | A3 | B22 | 4 | 0.1 | Very good | 90% or more | 60 | 45 | 22 | Very good | Good | 61 |
| Embodiment 7 | A19 | B3 | 4 | 0.1 | Fair | 80-90% | 56 | 42 | 20 | Good | Good | 60 |
| Comparative example 1 | A' | B3 | 4 | 0.1 | Bad | Less than 60% | — | — | — | — | — | — |

TABLE 3-continued

| | Component B | | | | Production stability | | Mechanical properties | | | Appearance | | |
|---|---|---|---|---|---|---|---|---|---|---|---|---|
| | Component A | Component | Part by mass* | Component C | Stability | Productivity | Tensile strength MPa | Tensile elongation % | Weld line % | Molding appearance | Welded portion | Lightness |
| Comparative example 2 | A1 | B3 | 4 | 0.1 | Fair | 90% or more | 44 | 47 | 23 | Bad | — | — |
| Comparative example 3 | A5 | B3 | 4 | 0.1 | Fair | 90% or more | 54 | 24 | 13 | Bad | — | — |
| Embodiment 8 | A3 | B3 | 0.3 | 0.1 | Very good | 90% or more | 64 | 49 | 23 | Good | Good | 60 |
| Embodiment 9 | A3 | B3 | 8 | 0.1 | Good | 80-90% | 54 | 37 | 16 | Very good | Good | 63 |
| Comparative example 4 | A3 | — | — | 0.1 | Very good | 100% | 65 | 50 | 25 | — | Very good | 40 |
| Comparative example 5 | A3 | B3 | 15 | 0.1 | Fair | 70-80% | 46 | 22 | 11 | Fair | Good | 62 |
| Embodiment 10 | A3 | B2 | 4 | 0.1 | Very good | 90% or more | 60 | 39 | 20 | Very good | Good | 62 |
| Embodiment 11 | A3 | B4 | 4 | 0.1 | Very good | 90% or more | 60 | 44 | 22 | Very good | Good | 61 |
| Comparative example 6 | A3 | B1 | 4 | 0.1 | Fair | 80-90% | 62 | 24 | 12 | Bad | — | — |
| Comparative example 7 | A3 | B5 | 4 | 0.1 | Fair | 80-90% | 44 | 41 | 20 | Bad | — | — |

*Powdery aluminum part by mass with respect to 100 parts by mass of polyacetal copolymer

TABLE 4

| | Component B | | | | Production stability | | Mechanical properties | | | Appearance | | |
|---|---|---|---|---|---|---|---|---|---|---|---|---|
| | Component A | Component | Part by mass* | Component C | Stability | Productivity | Tensile strength MPa | Tensile elongation % | Weld line % | Molding appearance | Welded portion | Lightness |
| Embodiment 12 | A6 | B3 | 4 | 0.1 | Very good | 60-70% | 55 | 51 | 26 | Very good | Good | 60 |
| Embodiment 13 | A7 | B3 | 4 | 0.1 | Very good | 80-90% | 57 | 50 | 25 | Very good | Good | 61 |
| Embodiment 14 | A8 | B3 | 4 | 0.1 | Very good | 90% or more | 60 | 42 | 21 | Very good | Good | 62 |
| Embodiment 15 | A9 | B3 | 4 | 0.1 | Very good | 90% or more | 61 | 32 | 16 | Very good | Good | 62 |
| Embodiment 16 | A11 | B3 | 4 | 0.1 | Very good | 90% or more | 59 | 46 | 23 | Very good | Good | 63 |
| Embodiment 17 | A10 | B3 | 4 | 0.1 | Very good | 90% or more | 58 | 48 | 24 | Very good | Good | 62 |
| Embodiment 18 | A12 | B3 | 4 | 0.1 | Very good | 90% or more | 56 | 50 | 25 | Very good | Good | 61 |
| Embodiment 19 | A13 | B3 | 4 | 0.1 | Very good | 90% or more | 54 | 50 | 25 | Very good | Good | 58 |
| Embodiment 20 | A14 | B3 | 4 | 0.1 | Very good | 90% or more | 58 | 45 | 21 | Very good | Good | 62 |
| Embodiment 21 | A15 | B3 | 4 | 0.1 | Very good | 90% or more | 58 | 46 | 23 | Very good | Good | 62 |
| Embodiment 22 | A16 | B3 | 4 | 0.1 | Very good | 90% or more | 59 | 49 | 24 | Very good | Good | 61 |
| Embodiment 23 | A17 | B3 | 4 | 0.1 | Very good | 90% or more | 59 | 50 | 25 | Very good | Good | 61 |
| Embodiment 24 | A3 | B3 | 4 | 0 | Good | 90% or more | 61 | 45 | 22 | Very good | Good | 61 |
| Embodiment 25 | A3 | B3 | 4 | 0.05 | Very good | 90% or more | 60 | 45 | 22 | Very good | Good | 61 |
| Embodiment 26 | A3 | B3 | 4 | 0.2 | Very good | 90% or more | 59 | 45 | 22 | Very good | Good | 61 |
| Embodiment 27 | A3 | B3 | 4 | 0.3 | Very good | 90% or more | 58 | 43 | 21 | Very good | Good | 61 |

*Powdery aluminum part by mass with respect to 100 parts by mass of polyacetal copolymer

TABLE 5

| | Component B | | | | Production stability | | Mechanical properties | | | Appearance | | |
|---|---|---|---|---|---|---|---|---|---|---|---|---|
| | Component A | Component | Part by mass* | Component C | Stability | Productivity | Tensile strength MPa | Tensile elongation % | Weld line % | Molding appearance | Welded portion | Lightness |
| Embodiment 28 | A3 | B6 | 4 | 0.1 | Very good | 90% or more | 61 | 46 | 23 | Good | Good | 63 |
| Embodiment 29 | A3 | B7 | 4 | 0.1 | Very good | 90% or more | 62 | 40 | 21 | Fair | Very good | 63 |
| Embodiment 30 | A3 | B8 | 4 | 0.1 | Very good | 90% or more | 61 | 40 | 21 | Good | Good | 64 |
| Embodiment 31 | A3 | B9 | 4 | 0.1 | Very good | 90% or more | 63 | 38 | 20 | Fair | Very good | 64 |
| Embodiment 32 | A3 | B10 | 4 | 0.1 | Fair | 80-90% | 51 | 48 | 24 | Very good | Good | 56 |
| Embodiment 33 | A3 | B11 | 4 | 0.1 | Very good | 90% or more | 58 | 46 | 23 | Very good | Good | 59 |
| Embodiment 34 | A3 | B12 | 4 | 0.1 | Very good | 90% or more | 61 | 42 | 21 | Very good | Very good | 62 |
| Embodiment 35 | A3 | B13 | 4 | 0.1 | Very good | 90% or more | 63 | 32 | 16 | Very good | Very good | 64 |
| Embodiment 36 | A3 | B14 | 4 | 0.1 | Very good | 90% or more | 60 | 41 | 17 | Very good | Good | 61 |
| Embodiment 37 | A3 | B15 | 4 | 0.1 | Very good | 80-90% | 61 | 45 | 22 | Very good | Good | 61 |
| Embodiment 38 | A3 | B16 | 4 | 0.1 | Good | 60-70% | 61 | 46 | 23 | Very good | Good | 63 |
| Embodiment 39 | A3 | B17 | 4 | 0.1 | Very good | 90% or more | 61 | 46 | 23 | Very good | Good | 58 |
| Embodiment 40 | A3 | B18 | 4 | 0.1 | Very good | 90% or more | 60 | 45 | 22 | Very good | Good | 61 |
| Embodiment 41 | A3 | B19 | 4 | 0.1 | Very good | 90% or more | 54 | 42 | 21 | Good | Good | 60 |
| Embodiment 42 | A3 | B20 | 4 | 0.1 | Good | 80-90% | 51 | 39 | 20 | Good | Fair | 56 |
| Embodiment 43 | A3 | B11/B12 | 2/2 | 0.1 | Very good | 90% or more | 61 | 46 | 21 | Very good | Very good | 63 |

*Powdery aluminum part by mass with respect to 100 parts by mass of polyacetal copolymer

TABLE 6

| | Component B | | | | Production stability | | Mechanical properties | | | Appearance | | |
|---|---|---|---|---|---|---|---|---|---|---|---|---|
| | Component A | Component | Part by mass* | Component C | Stability | Productivity | Tensile strength MPa | Tensile elongation % | Weld line % | Molding appearance | Welded portion | Lightness |
| Embodiment 44 | A3 | (B3) | 4 | 0.1 | Good | 70-80% | 52 | 38 | 20 | Good | Good | 56 |
| Embodiment 45 | A3 | (B12) | 4 | 0.1 | Good | 70-80% | 53 | 39 | 21 | Good | Good | 58 |
| Embodiment 46 | (A3) | (B3) | 4 | 0.1 | Good | 80-90% | 54 | 39 | 21 | Good | Good | 51 |
| Embodiment 47 | (A3) | (B12) | 4 | 0.1 | Good | 80-90% | 54 | 40 | 21 | Good | Good | 52 |

*Powdery aluminum part by mass with respect to 100 parts by mass of polyacetal copolymer

What is claimed is:

1. A polyacetal resin composition comprising:
a polyacetal copolymer;
0.2 to 2 parts by mass of a hindered amine material and 0.2 to 10 parts by mass of powdery aluminum, with respect to 100 parts by mass of the polyacetal copolymer; and
0.3 to 10 parts by mass of a fatty acid having a carbon number of 10 to 30, with respect to 100 parts by mass of the powdery aluminum.

2. The polyacetal resin composition according to claim 1, wherein the polyacetal copolymer has a melt mass flow rate (MFR) of 2.5 to 40 g/10 minutes.

3. The polyacetal resin composition according to claim 1, further comprising 0.3 to 3 parts by mass of a polyalkylene glycol, with respect to 100 parts by mass of the polyacetal copolymer.

4. The polyacetal resin composition according to claim 3, wherein the polyalkylene glycol is a polyethylene glycol having a number average molecular weight of 800 to 500,000.

5. The polyacetal resin composition according to claim 1, further comprising 0.03 to 0.25 part by pass of a hydrazide compound, with respect to 100 parts by mass of the polyacetal copolymer.

6. The polyacetal resin composition according to claim 1, wherein the hindered amine material has a piperidine derivative structure represented by a general formula (3);

(3)

where $R_1$ to $R_4$ are identical or different alkyl groups.

7. The polyacetal resin composition according to claim 1, wherein the powdery aluminum has a discoidal or scale-like shape.

8. The polyacetal resin composition according to claim 1, wherein the powdery aluminum has an average particle diameter of 3 to 80 μm.

9. The polyacetal resin composition according to claim 1, wherein the powdery aluminum has a particle diameter distribution [Dw/Dn] of 1.1 to 2.0.

10. The polyacetal resin composition according to claim 1, wherein the powdery aluminum has an average particle thickness of 0.4 μm or greater.

11. The polyacetal resin composition according to claim 1, wherein the powdery aluminum includes at least two aluminum powders, each aluminum powder having an average particle diameter, wherein the average particle diameter of the at least two aluminum powders differs by 20 μm or greater.

12. A molded body formed from the polyacetal resin composition according to claim 1.

13. The molded body according to claim 12, wherein the molded body is used as a part for office automation equipment, an audio, video, or information device, a communication device, an industrial part used for office furniture or housing equipment, or a vehicle interior/exterior component.

14. The molded body according to claim 12, wherein the part is a handle, a shift knob, a lever, a switch, or a button.

15. The molded body according to claim 12, wherein a design surface of the part is partially or entirely grain processed.

16. A method of producing the polyacetal resin composition according to claim 1, the method comprising:
mixing the powdery aluminum and the fatty acid;
pre-melt-kneading the polyacetal copolymer and the hindered amine material; and
mixing the mixtures obtained from the mixing and the pre-melt-kneading.

17. The method of producing the polyacetal resin composition according to claim 16, wherein the powdery aluminum is dried, and then mixed with the fatty acid.

18. The polyacetal resin composition according to claim 2, further comprising 0.3 to 3 parts by mass of a polyalkylene glycol, with respect to 100 parts by mass of the polyacetal copolymer.

* * * * *